(12) United States Patent
Schrock et al.

(10) Patent No.: US 9,036,361 B2
(45) Date of Patent: May 19, 2015

(54) AVIONIC MEDIA SYSTEMS INCLUDING ACTUATED MEDIA DOCKING STATIONS AND OVER-CENTER LOCKING MECHANISMS SUITABLE FOR USAGE THEREIN

(75) Inventors: Kevin Schrock, Sarasota, FL (US); Manjunath Hadadi, Karnataka (IN); Animesh Mukherjee, Karnataka (IN); Elliott Onstine, Sarasota, FL (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 523 days.

(21) Appl. No.: 13/356,352

(22) Filed: Jan. 23, 2012

(65) Prior Publication Data

US 2013/0188300 A1    Jul. 25, 2013

(51) Int. Cl.
*H05K 5/00*    (2006.01)
*H05K 7/00*    (2006.01)
*G06F 1/16*    (2006.01)
*G11B 33/12*    (2006.01)

(52) U.S. Cl.
CPC ............ *G11B 33/124* (2013.01); *G06F 1/1632* (2013.01)

(58) Field of Classification Search
CPC .............................. G06F 1/1632; G11B 33/124
USPC ............... 361/679.26–679.3, 679.32–679.39, 361/724–727, 752, 759, 679.4–679.45, 361/679.55–679.58, 754–756; 248/346.06, 248/316.4–316.7, 309.1; 211/77, 85.17, 211/130.1, 132.1, 169.1, 195; 720/647; 307/9.1
See application file for complete search history.

(56) References Cited

U.S. PATENT DOCUMENTS

| | | | |
|---|---|---|---|
| 5,177,730 A * | 1/1993 | Utsugi | ........................... 720/646 |
| 5,779,205 A | 7/1998 | Ching | |
| 5,940,502 A | 8/1999 | Hirai et al. | |
| 5,956,399 A | 9/1999 | Whitley et al. | |
| 6,002,921 A | 12/1999 | Pfahlert et al. | |
| 6,208,734 B1 | 3/2001 | Ortscheid et al. | |

(Continued)

FOREIGN PATENT DOCUMENTS

JP    2003-110677    4/2003

OTHER PUBLICATIONS

RAM Mounts for the Apple IPad & IPad 2; Taken from the Internet on Nov. 7, 2011 from http://www.rammount.com/NewProducts/AppleiPadMounts/tabid/2614/Default.aspx.

*Primary Examiner* — Adrian S Wilson
*Assistant Examiner* — Abhishek Rathod
(74) *Attorney, Agent, or Firm* — Ingrassia Fisher & Lorenz, P.C.

(57) ABSTRACT

Embodiments of an avionic media system are provided, as are embodiments of an actuated media docking station and embodiments of an over-center locking mechanism suitable for usage in an actuated media docking station. In one embodiment, the avionic media system includes an actuated media docking station and an onboard electronic device. The actuated media docking station includes, in turn, a housing assembly, a mass media device ("MMD") receptacle coupled to the housing assembly, a connector mounted to the MMD receptacle and configured to interface with the MMD when inserted into the MMD receptacle, and an actuator coupled to the housing assembly and to the MMD receptacle. The actuator moves the MMD receptacle between: (i) a loading position in which an MMD can be inserted into the MMD receptacle, and (ii) a retaining position in which removal of an MMD from the MMD receptacle is physically obstructed.

17 Claims, 8 Drawing Sheets

(56) References Cited

U.S. PATENT DOCUMENTS

| | | |
|---|---|---|
| 6,229,893 B1 | 5/2001 | Chen |
| 6,339,699 B1 | 1/2002 | Hirai et al. |
| 6,647,248 B1 | 11/2003 | Ortscheid et al. |
| 6,785,567 B2 | 8/2004 | Kato |
| 6,961,237 B2 * | 11/2005 | Dickie .................... 361/679.04 |
| 7,014,486 B1 | 3/2006 | Wu et al. |
| 7,017,243 B2 | 3/2006 | Carnevali |
| 7,062,300 B1 | 6/2006 | Kim |
| 7,066,752 B2 | 6/2006 | Hsu et al. |
| 7,103,397 B2 | 9/2006 | Oh |
| 7,134,877 B2 * | 11/2006 | Matumoto et al. ............ 434/379 |
| 7,158,092 B2 | 1/2007 | Shen |
| 7,159,226 B2 * | 1/2007 | Sasaki et al. .................. 720/646 |
| 7,319,887 B2 | 1/2008 | Mollinari |
| 7,540,379 B2 * | 6/2009 | Yau ............................... 206/320 |
| 7,551,458 B2 | 6/2009 | Carnevali |
| 7,668,576 B2 | 2/2010 | Ellenbogen et al. |
| 7,733,643 B1 * | 6/2010 | Rumpf .................... 361/679.43 |
| 7,747,009 B2 | 6/2010 | Cullman |
| 7,801,572 B2 | 9/2010 | Bury |
| 7,818,035 B2 | 10/2010 | Bury |
| 7,885,057 B2 * | 2/2011 | Itoh .......................... 361/679.01 |
| D650,784 S * | 12/2011 | Feldstein et al. ............. D14/434 |
| D692,008 S * | 10/2013 | Feldstein et al. ............. D14/447 |
| 8,559,172 B2 * | 10/2013 | Byrne ..................... 361/679.41 |
| 2002/0032041 A1 | 3/2002 | Hirai et al. |
| 2005/0264983 A1 * | 12/2005 | Chen ............................ 361/681 |
| 2007/0019387 A1 | 1/2007 | Schipper et al. |
| 2007/0087725 A1 * | 4/2007 | Anderson .................... 455/348 |
| 2008/0259550 A1 | 10/2008 | Lien |
| 2009/0097192 A1 * | 4/2009 | Riddiford ................ 361/679.01 |
| 2009/0153002 A1 * | 6/2009 | Kinoshita et al. .......... 312/223.1 |
| 2010/0171021 A1 | 7/2010 | Smith |
| 2010/0315041 A1 | 12/2010 | Tan |
| 2010/0317412 A1 | 12/2010 | Tan |
| 2010/0317413 A1 | 12/2010 | Tan |
| 2011/0220430 A1 | 9/2011 | Fowler |
| 2012/0068832 A1 * | 3/2012 | Feldstein et al. ............. 340/12.5 |

* cited by examiner

AVIONIC MEDIA SYSTEMS INCLUDING ACTUATED MEDIA DOCKING STATIONS AND OVER-CENTER LOCKING MECHANISMS SUITABLE FOR USAGE THEREIN

TECHNICAL FIELD

Embodiments of the present invention relate generally to aircraft systems and, more particularly, to avionic media systems including actuated media docking stations, as well as to over-center locking mechanisms suitable for usage in actuated media docking stations.

BACKGROUND

Digital audio players, portable media players, removable mass storage devices (e.g., portable hard disk drives and flash drives), digital cameras, personal digital assistants, smartphones, and other such portable mass media devices ("MMDs") have become commonplace in modern society. Various different types of media docking stations have been developed and commercially marketed for the home usage, which enable users to quickly connect or dock a MMD with larger systems to, for example, download digital files to or upload digital files from an MMD, to render video content stored on the MMD on a system monitor, and/or to play audio content stored on the MMD on system speakers. The general prevalence of MMDs has translated into a commercial demand to provide mass media docking stations suitable for usage onboard business-class jets and other passenger aircraft. However, media docking stations designed for home usage may be unsuitable for incorporation into larger electrical systems deployed onboard aircraft. For example, conventionally-known docking stations may be undesirable cumbersome, heavy, and/or fragile for usage onboard aircraft. More importantly, conventionally-known media docking stations typically do not provide a means of securely retaining a docked MMD, and thereby preventing the forceful ejection of MMD from the docking station, when subjected to sudden and significant disturbance forces as may be encountered during takeoff, landing, and abrupt maneuvering of the aircraft.

There thus exists an ongoing demand to provide embodiments of a media docking station suitable for usage onboard an aircraft or other vehicle. It would be desirable for such a media docking station to be relatively lightweight, rugged, compact, and capable of operation in both horizontal and vertical orientations to permit integration of the docking station into various locations within the aircraft, such as mounting within a cabin wall. It would be especially desirable for embodiments of such a media docking station allow retraction or withdraw of a docked mass media device into a ruggedized housing such that the mass media device cannot be thrown or dislodged from the docking station in the event of abrupt inertial loads. Ideally, such a media docking station would securely lock the mass media device in such a refracted position, and possibly in an opposing extended position, utilizing a structurally-robust mechanical means requiring little to no power consumption. Finally, it would also be desirable to provide embodiments of an avionic media systems including such an actuated media docking station. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of an avionic media system are provided. In one embodiment, the avionic media system includes an actuated media docking station and an onboard electrical device. The actuated media docking station includes, in turn, a housing assembly, a mass media device ("MMD") receptacle coupled to the housing assembly, a connector mounted to the MMD receptacle and configured to interface with the MMD when inserted into the MMD receptacle, and an actuator coupled to the housing assembly and to the MMD receptacle. The actuator moves the MMD receptacle between: (i) a loading position in which an MMD can be inserted into the MMD receptacle, and (ii) a retaining position in which removal of an MMD from the MMD receptacle is physically obstructed.

Embodiments of an actuated media docking station are further provided. In one embodiment, the actuated media docking station includes a housing assembly, a mass media device ("MMD") receptacle hingedly mounted to the housing assembly, and an actuator coupled to the housing assembly and to the MMD receptacle. The actuator rotates the MMD receptacle between: (i) a loading position in which an MMD can be inserted into the MMD receptacle, and (ii) a retaining position in which removal of an MMD from the MMD receptacle is physically obstructed.

Embodiments of an over-center locking mechanism for usage in conjunction with pivoting member and a rotary actuator are still further provided. In one embodiment, the over-center locking mechanism includes a motor arm configured to be fixedly coupled to the rotary actuator for rotation about a fixed rotational axis, and an over-center link rotatably coupled to the motor arm at an input pivot point and configured to be rotatably coupled to the pivoting member at an output pivot point. The over-center locking mechanism is movable between: (i) an extended locked position wherein the input pivot point resides on a first side of a plane transecting the fixed rotational axis and the output pivot point, and (ii) a refracted locked position wherein the input pivot point also resides on the first side of the plane transecting the fixed rotational axis and the output pivot point. The input pivot point traverses the plane when the over-center locking mechanism is moved between the extended locked position and the retracted locked position.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following detailed description.

Figure 1:
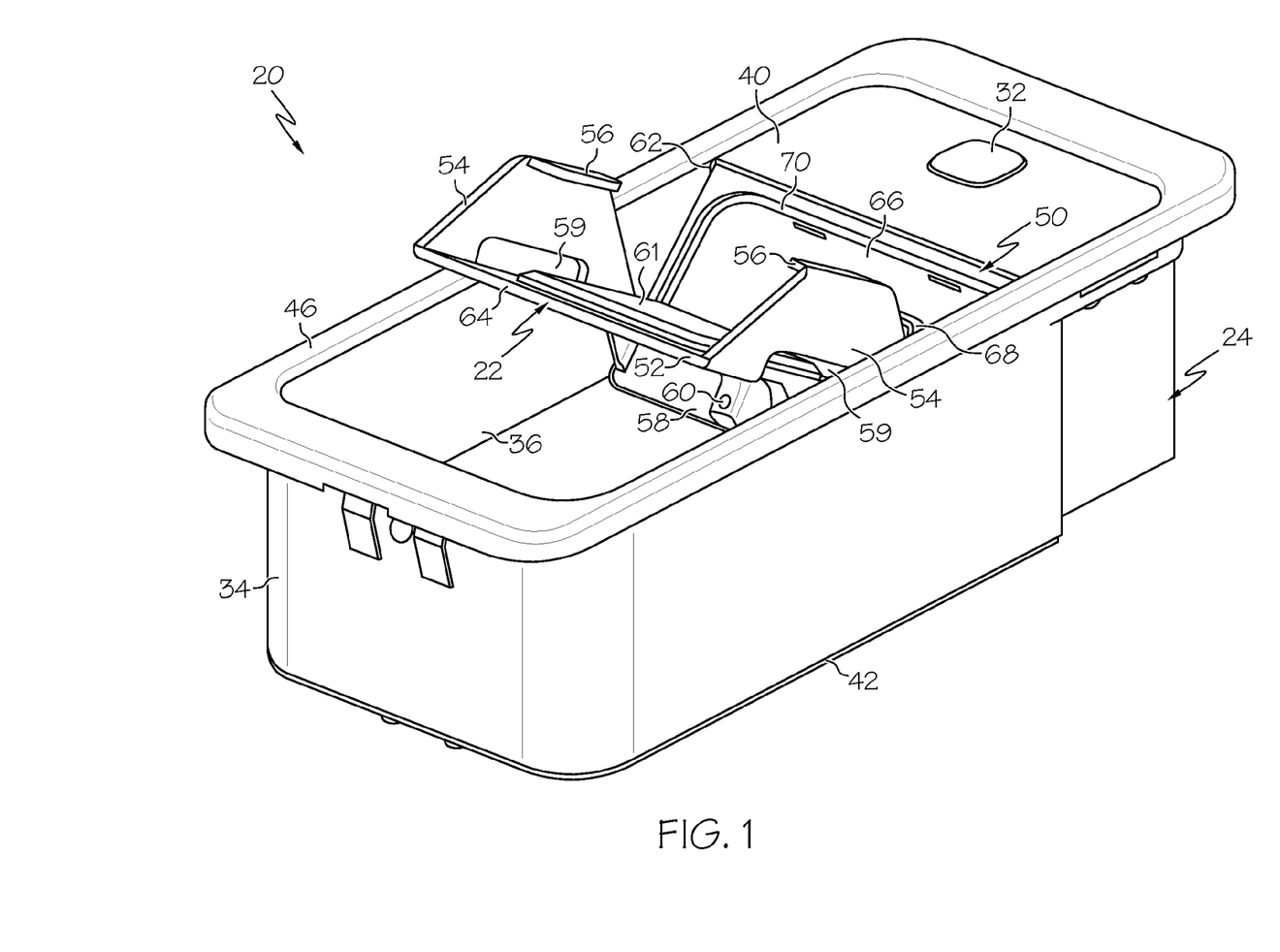
FIGS. 1 and 2 are isometric views of an actuated media docking station in loading and retaining positions, respectively, as illustrated in accordance with exemplary embodiment of the present invention.
Figure 2:
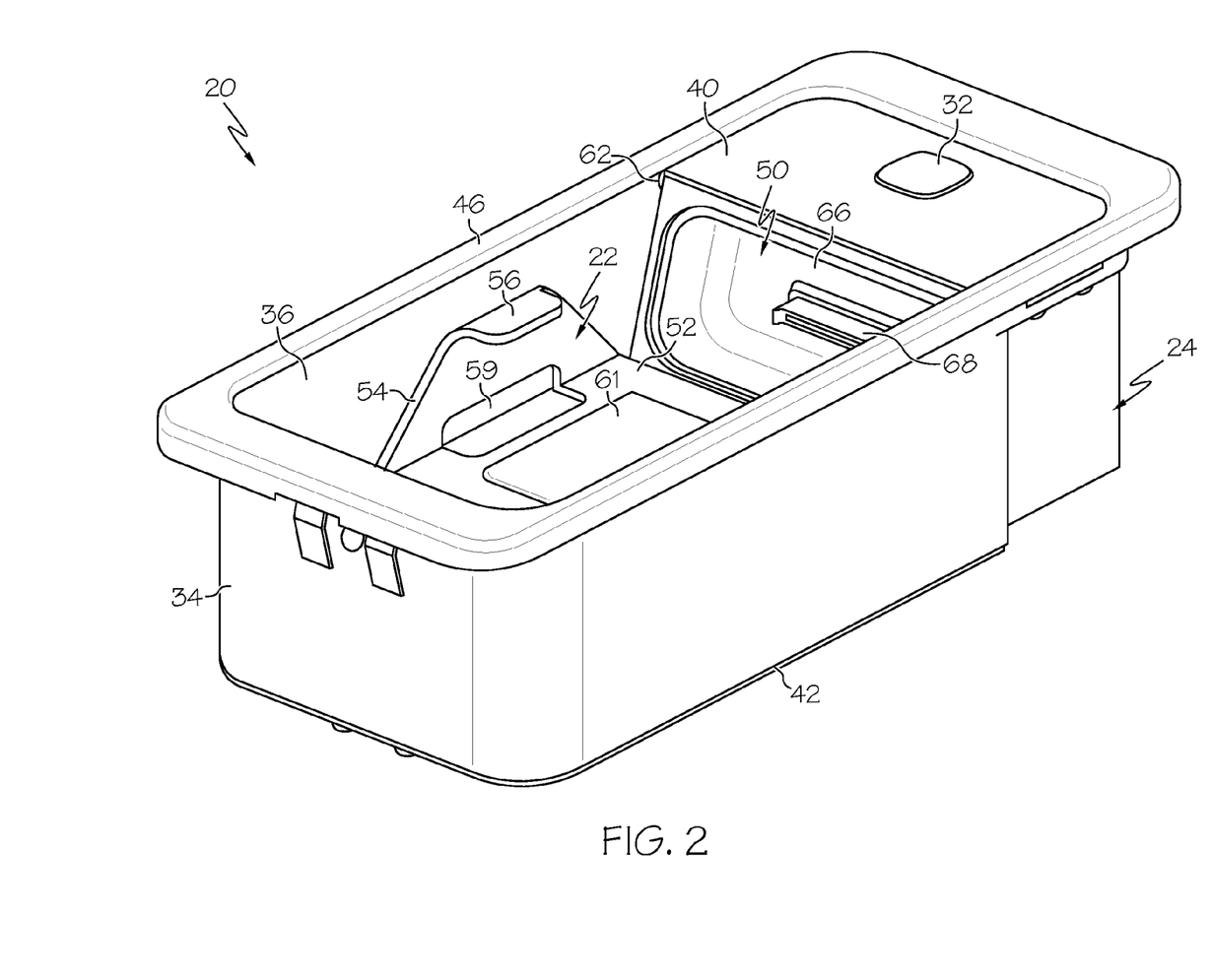

FIGS. 1 and 2 are isometric views of an actuated media docking station 20 illustrated in accordance with an exemplary embodiment of the present invention. Embodiments of actuated media docking station 20 can be designed for usage in conjunction with a specific type of mass media device ("MMD"), which may or may not be commercially available; however, in preferred embodiments, docking station 20 is designed to be universally compatible with any number of commercially-available MMDs. Such MMDs may include digital audio players, portable media players, removable/portable mass storage devices (e.g., portable hard disk drives and flash drives), digital cameras, personal digital assistants, and smartphones, to list but a few examples. In this respect, embodiments of actuated media docking station 20 are similar to certain other conventionally-known universal docking stations developed and commercially marketed for home use. However, in contrast to other known docking stations, docking station 20 can be actuated to retract or withdraw a docked MMD into a ruggedized housing to prevent disengagement and/or forceful ejection of the MMD from docking station 20 in the event of significant and abrupt inertial loads. For this and other reasons, embodiments of actuated media docking station 20 are well-suited for usage onboard aircraft, such as commercial airliners and business-class jets, as well as other types of vehicles (e.g., water-borne and ground-based vehicles). In preferred embodiments, actuated media docking station 20 is included within an avionic media system, such as system 130 described below in conjunction with FIG. 9.

Figure 3:
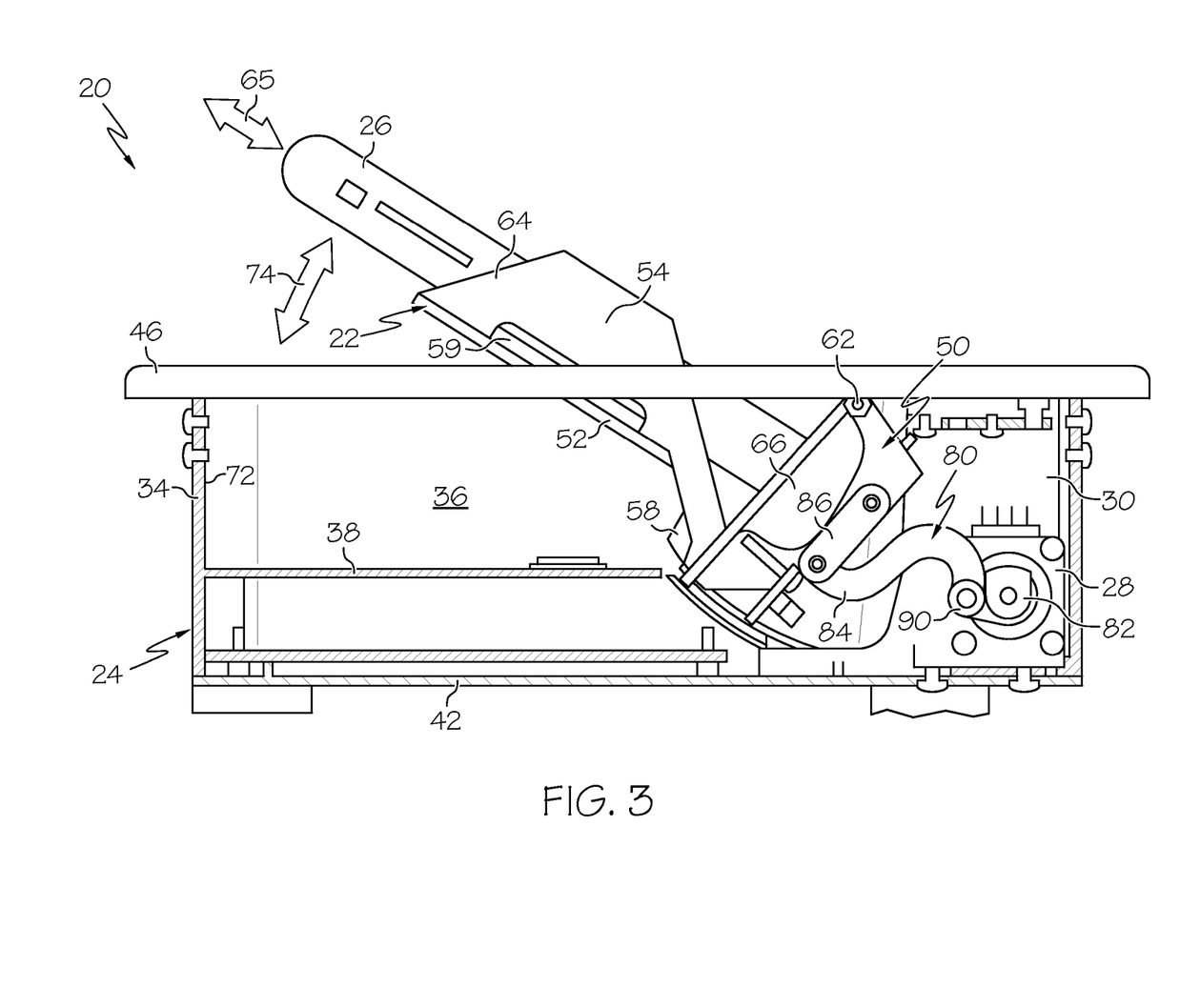
FIGS. 3 and 4 are side views of an exemplary mass media device and the actuated media docking station (shown in partial cutaway) in loading and retaining positions, respectively.
Figure 4:
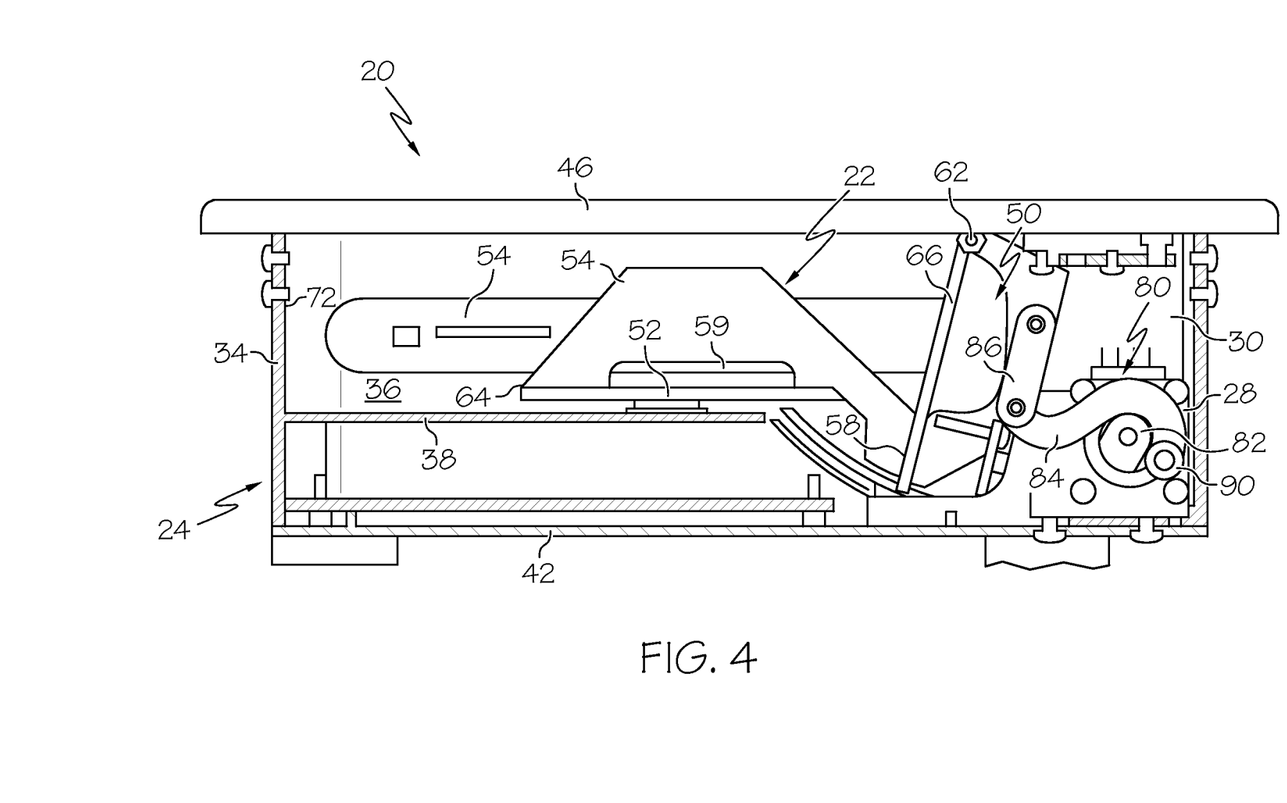

Actuated media docking station 20 includes an MMD receptacle 22 and a ruggedized housing assembly 24. MMD receptacle 22 is hingedly joined to housing assembly 24 and rotatable between: (i) an extended or "loading" position (shown in FIG. 1) in which an MMD can be manually inserted into MMD receptacle 22 or removed therefrom; and (ii) a retracted or "retaining" position (shown in FIG. 2) in which receptacle 22 rotates into housing assembly 24 to physically prevent the removal or forceful ejection of a docked MMD. FIGS. 3 and 4 further illustrate docking station 20 in loading and retaining positions, respectively, after insertion of an exemplary MMD 26 into MMD receptacle 22. As shown in FIGS. 3 and 4, an actuator 28 may be disposed within an actuator cavity 30 internal to housing assembly 24 and, when activated, may rotate MMD receptacle 22 between the loading position (shown in FIGS. 1 and 3) and the retaining position (shown in FIGS. 2 and 4). Actuator 28 may rotate MMD receptacle 22 between these two positional extremes in response to activation of a user input; e.g., the actuator may rotate receptacle 22 from its current position to the opposing position when a user depresses a button 32 provided on the exterior of housing assembly 24 (shown in FIGS. 1 and 2) and operatively coupled to actuator 28. Additionally or alternatively, actuator 28 may rotate MMD receptacle 22 between the loading position (FIGS. 1 and 3) and the retaining position (FIGS. 2 and 4) in response to receipt of a stow signal supplied by an external controller included within a larger avionic media system of the type described below in conjunction with FIG. 9.

Housing assembly 24 can include any number of components suitable for supporting MMD receptacle 22 and for cooperating or combining with receptacle 22 to enclose or otherwise capture a docked MMD when receptacle 22 is rotated in the retaining position shown in FIGS. 2 and 4. In the exemplary embodiment shown in FIGS. 1-4, housing assembly 24 includes a casing or frame 34, which extends around and thus circumferentially bounds an open device cavity 36. Device cavity 36 is exposed through the outer face of actuated media docking station 20. Device cavity 36 will typically open in either a forward direction or in an upward direction depending upon whether docking station 20 is mounted in a generally vertical or horizontal orientation, respectively. The floor of open device cavity 36 is defined by an internal wall 38 provided within frame 34, as shown most clearly in FIGS. 3 and 4. Frame 34 further extends around and thus bounds a portion of actuator cavity 30, which is enclosed by an actuator faceplate 40. A rear cover 42 is affixed to the backside of frame 34 utilizing a first plurality of bolts, screws, or other such fasteners (not shown). A rounded bezel 46 is further positioned over the outer circumferential edge of frame 34 and may be attached thereto utilizing, for example, a second plurality of fasteners (not shown).

Device cavity 36 accommodates or receives MMD receptacle 22 and MMD 26 when receptacle 22 is rotated into the retaining position (FIGS. 2 and 4). Open device cavity 36 will thus typically be sized and shaped to generally conform with the largest mass media device likely to be utilized with docking station 20. In the illustrated example, device cavity 36 has a generally rectangular planform geometry, and the height and width of cavity 36 are slightly greater than the respective height and width of MMD 26. The depth of cavity 36 is preferably sufficient to allow MMD 26 to be fully withdrawn into housing 24 when MMD receptacle 22 is rotated into the retaining position (FIGS. 2 and 4); however, this need not always be the case.

MMD receptacle 22 can assume the form of any structural element or assemblage of structural elements into which an MMD can be slidably inserted; which can be rotatably mounted to housing assembly 24; and which cooperates with housing assembly 24 and/or another component of docking station 20 to physically prevent the disengagement of a docked MMD when MMD receptacle 22 resides in the retaining position (FIGS. 2 and 4). In the exemplary embodiment shown in FIGS. 1-4, MMD receptacle 22 includes a base member 50, a backrest 52, opposing backrest sidewalls 54, and first and second retention tabs 56 (shown most clearly in FIGS. 1 and 2). Base member 50 is positioned within open device cavity 36 and hingedly mounted to housing assembly 24 utilizing, for example, first and second hinge pins 62. Backrest 52 is fixedly joined to and extends longitudinally from base member 50; e.g., backrest 52 may be fabricated to include a lower flange 58, which is affixed to an inner edge portion of base member 50 by fasteners 60 (one of which is shown in FIG. 1). Backrest sidewalls 54 extend axially from opposing longitudinal edges of backrest in a generally forward direction to flank or enclose the sides of MMD 26 (FIGS. 3 and 4) or other such MMD inserted into receptacle 22. In embodiments wherein docking station 20 is deployed onboard an aircraft, cutouts 59 may be provided in sidewalls 54 for weight saving purposes or ease of manufacturing, as further indicated in FIGS. 1-4. In preferred embodiments, backrest 52, opposing backrest sidewalls 54, and first and second retention tabs 56 are integrally fabricated as a single, manufactured piece.

First and second retention tabs 56 extend laterally inward from opposing sidewalls 54 to cover or encroach over an outer peripheral portion of the front face of MMD 26. Backrest 52, opposing sidewalls 54, and retention tabs 56 thus collectively wrap around MMD 26 to prevent removal of MMD 26 in all directions except along a predetermined insertion/removal axis (generically shown in FIG. 3 at 65 and described below). Retention tabs 56, specifically, prevent removal of MMD 26 through the open face of receptacle 22 in an axial or forward direction. At the same time, retention tabs 56 cover a relatively small region of the perimeter of the MMD face to minimize obstruction of any forward-facing controls, whether physical or virtual (touchscreen), provided on MMD 26 when MMD 26 is held by receptacle 22. A compressible pad 61 may further be adhered or otherwise attached to backrest 52 to cushion and to protect the surface finish of the backside of MMD 26, which may jostle slightly within MMD 26 in embodiments wherein docking station 20 is utilized within a high vibratory avionic environment. Pad 61 may be fabricated from a tacky material to further help retain MMD 26 in place in the loading and retaining positions shown in FIGS. 1-4.

As previously stated, MMD 26 can be slidably inserted into MMD receptacle 22 when in the loading position shown in FIGS. 1 and 3. More specifically, MMD receptacle 22 is fabricated to include an outer, receiving end portion 64 having an opening through which the bottom portion of MMD 26 can pass as MMD 26 is slidably inserted into and removed from MMD receptacle 22, as taken along an insertion/removal axis (represented in FIG. 3 by double headed arrow 65). When inserted into MMD receptacle 22 along axis 65, the bottom portion of MMD 26 seats within a connector well 66 provided within base member 50. As MMD 26 seats within well 66, a device-side connector included within MMD 26 (hidden from view in FIGS. 3 and 4) matingly engages a corresponding dock-side connector 68 positioned within connector well 66 (shown in FIGS. 1 and 2). Connector 68 will typically assume the form of a multi-pin connector, such as a conventionally-known thirty pin connector utilized in conjunction with commercially-available portable media players, such as an APPLE® IPOD®, and smartphones, such as an APPLE® IPHONE®. For this reason, connector 68 is illustrated in FIGS. 1-4 (and shown most clearly in FIG. 1) as a multi-pin connector and will be referred to herein as "multi-pin connector 68"; it is, however, emphasized that connector 68 can assume any form suitable for interfacing with a mating MMD connector to enable the transmission of data to and/or from a mass media device of the type described herein. In certain embodiments, a circumferential ledge or step 70 may further be provided around the outer perimeter of connector well 66 to matingly receive interchangeable adapter pieces or cups (not shown) corresponding to different MMD types or models as is conventionally known.

As MMD receptacle 22 rotates from the loading position (FIGS. 1 and 3) into the retaining position (FIGS. 2 and 4), open receiving end portion 64 swings toward and ultimately rotates into device cavity 36, as indicated in FIG. 3 by double headed arrow 74. In this manner, both MMD receptacle 22 and docked MMD 26 are fully retracted into device cavity 36 in the retaining position (FIGS. 2 and 4). When MMD receptacle 22 is in the retaining position (FIGS. 2 and 4), sliding removal of docked MMD 26 is physically obstructed or blocked by housing assembly 24 and, specifically, by internal wall 72 of frame 34 (identified in FIGS. 3 and 4). Stated differently, when MMD receptacle 22 is in the retaining position (FIGS. 2 and 4), open end portion 64 is covered or obstructed by wall 72 of frame 34, as taken along insertion/removal axis 65. As first and second retention tabs 56 wrap around or encroach over the front face of MMD 26 to prevent removal of MMD 26 in an axial direction (i.e., along an axis orthogonal to backrest 52), MMD 26 cannot be removed from actuated media docking station 20 when receptacle 22 is in the retaining position without disassembly or destruction of docking station 20. As a result, actuated media docking station 20 will prevent dislodgement of a mass media device, such as MMD 26, when MMD receptacle 22 is in the retaining position (FIGS. 2 and 4) even when subjected to significant and abrupt disturbances forces as might be encountered during hard touchdown, takeoff, or abrupt maneuvering of an aircraft carrying actuated media docking station 20.

It is desirable to lock or securely latch MMD receptacle 22 in the retaining position (FIGS. 2 and 4) to ensure that receptacle 22 cannot be inadvertently rotated into the loading position (FIGS. 1 and 3) and MMD 26 inadvertently thrown from docking station 20 by disturbances forces. Similarly, it is also desirable (although of lesser importance) to lock or securely latch MMD receptacle 22 in the loading position (FIGS. 1 and 3) to allow a user to utilize physical and/or virtual controls (e.g., depress buttons) provided on the face of MMD 26 without causing receptacle 22 to rotate toward the retaining position (FIGS. 2 and 4). Ideally, in embodiments wherein docking station 20 is deployed onboard an aircraft, the latching force locking MMD receptacle 22 in the retaining position (FIGS. 2 and 4) and, possibly, in the loading position (FIGS. 1 and 4) would be provided utilizing a mechanical means to minimize power consumption requirements. In preferred embodiments, actuator 28 assumes the form of a rotary actuator (e.g., a motor) having a rotary output, which is mechanically coupled to MMD receptacle 22 by way of unique, bi-stable, over-center locking mechanism capable of securely latching receptacle 22 in both the loading and retaining positions. An example of such a bi-stable, over-center locking mechanism 80 is shown in FIGS. 3 and 4 and described more fully below in conjunction with FIGS. 5-8.

Figure 5:
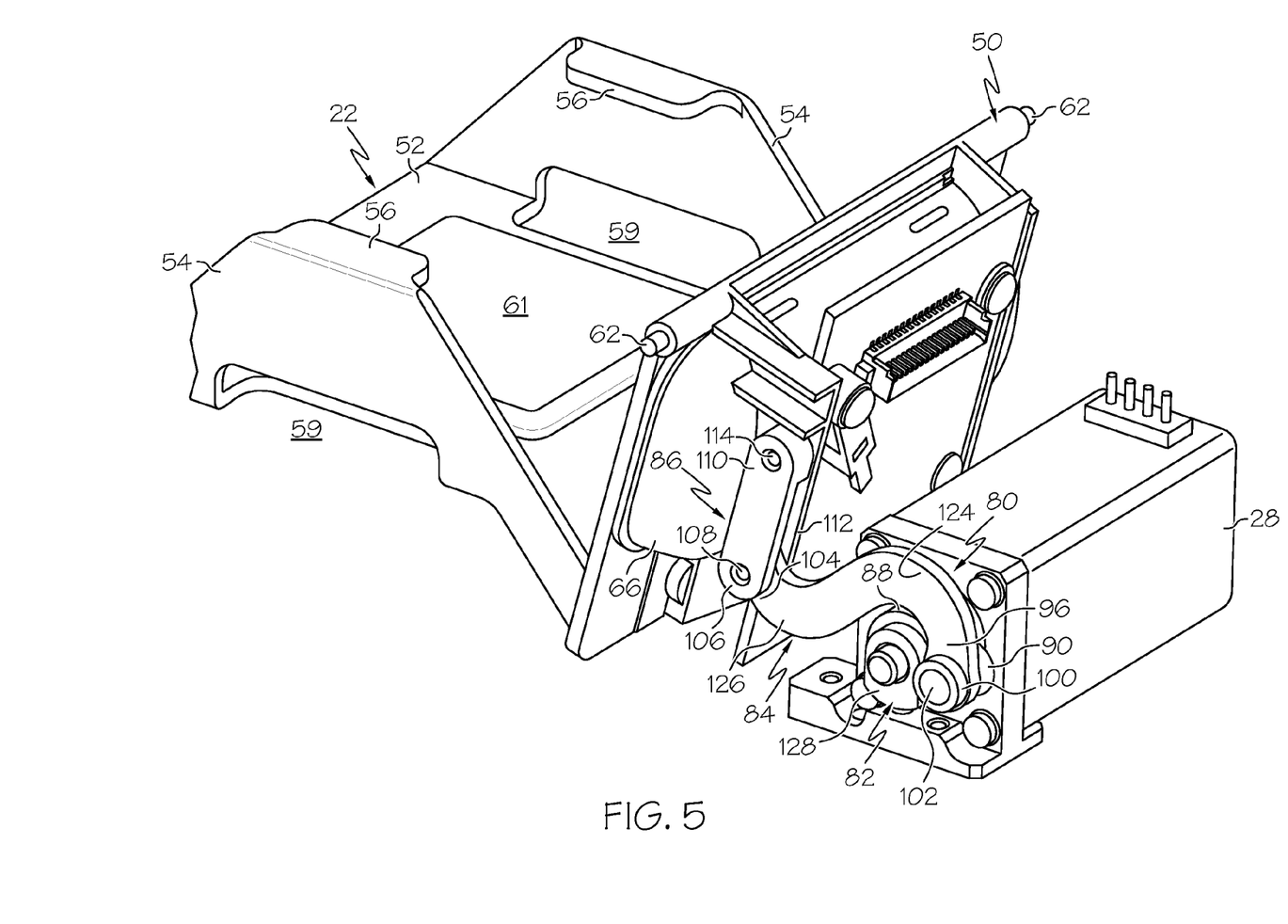
FIGS. 5 and 6 are isometric and exploded views, respectively, of a mass media device receptacle, an actuator, and an over-center locking mechanism included within the actuated media docking station shown in FIGS. 1-4.
Figure 6:
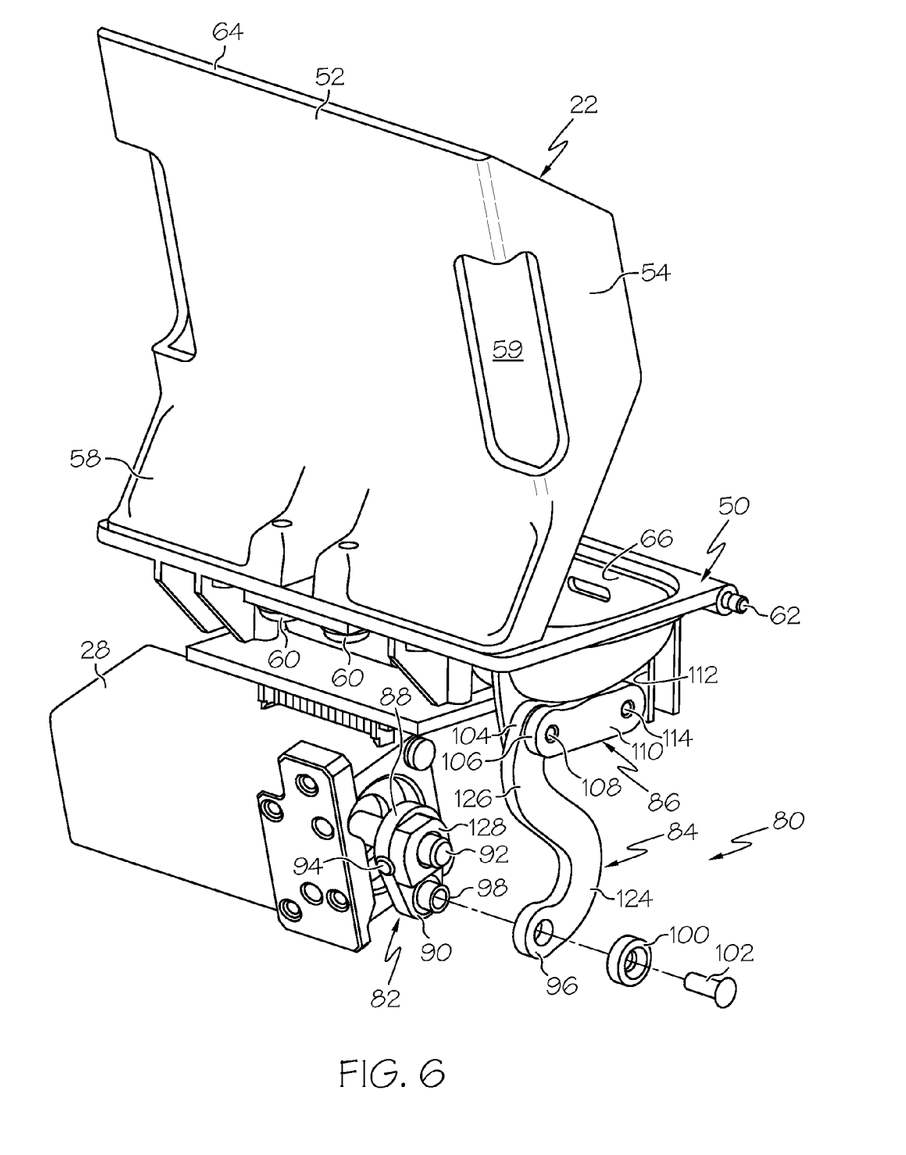

FIGS. 5 and 6 are isometric and exploded views, respectively, of MMD receptacle 22, actuator 28, and over-center locking mechanism 80 illustrating locking mechanism 80 in greater detail. As can be seen in FIGS. 5 and 6, over-center locking mechanism 80 includes three main components: (i) a motor arm 82, (ii) an over-center link 84, and (iii) a reinforcement piece 86. In the illustrated example, motor arm 82 assumes the form of a pear-shaped member (e.g., a machined piece) having an input end 88 and an output end 90. Input end 88 of motor arm 82 is affixed to the rotary output 92 of actuator 28. For example, as indicated in FIGS. 5 and 6, input end 88 may be machined or otherwise fabricated to include a bore through which rotary output 92 extends; and relative rotation between input end 88 of motor arm 82 and rotary output 92 of actuator 28 may be prevented utilizing, for example, a keyed interface or a set-screw 94 (FIG. 6) threadably coupled to motor arm 82. Output end 90 of motor arm 82 is rotatably coupled to an input end 96 of over-center link 84. In the illustrated example, specifically, output end 90 of motor arm 82 has an opening, which matingly receives an internally-threaded, tubular protuberance 98 extending from on output end 90 of motor arm 82 (also identified in FIG. 6); and a link retention cap 100 is affixed over protuberance 98 utilizing a threaded fastener 102 to capture input end 96 of over-center link 84 against output end 90 of motor arm 82, while permitting relative rotation therebetween. Output end 104 of over-center link 84 is, in turn, rotatably coupled to an end 106 of reinforcement piece 86 by a pin joint 108. The opposing end 110 of reinforcement piece 86 is attached to a lower flange 112 included within base member 50 by a fastener 114 (e.g., a screw). As a result of this structural arrangement, reinforcement piece 86 is rotationally fixed with respect to base member 50, while over-center link 84 may pivot with respect to base member 50 and reinforcement piece 86 about pin joint 108.

Over-center locking mechanism 80 is movable between an extend locked position (shown in FIG. 3) and a retracted locked position (shown in FIGS. 4 and 5). In the illustrated example, the extended locked position of locking mechanism 80 corresponds to the loading position of MMD receptacle 22, as described above in conjunction with FIGS. 1 and 3; while the retracted locked position of locking mechanism 80 corresponds to the retaining position of MMD receptacle 22, as described above in conjunction with FIGS. 2 and 4. Movement of over-center locking mechanism 80 between the extended locked position (FIG. 3) and the retracted locked position (FIGS. 4 and 5) is driven by actuator 28. In particular, as input end 88 of motor arm 82 is affixed to rotary output 92 of actuator 28, rotation of output 92 will result in corresponding rotation of motor arm 82 about a fixed rotational axis. For example, beginning from the extended locked position (FIG. 3), actuator 28 may be energized to rotate motor arm 82 about the fixed rotational axis in a first rotational direction (e.g., clockwise) over a predetermined angular range (approximately 215 degrees in the illustrated example). This results in retraction of over-center link 84 and the corresponding rotation of MMD receptacle 22 into the retaining position (FIGS. 2, 4, and 5). When in the retracted locked position (FIGS. 4 and 5), actuator 28 may again be energized or activated to rotate motor arm 82 about the fixed rotational axis in the opposing rotational direction (e.g., counter-clockwise) to extend over-center link 84 and return MMD receptacle 22 to the loading position shown in FIGS. 1 and 3.

Figure 7:
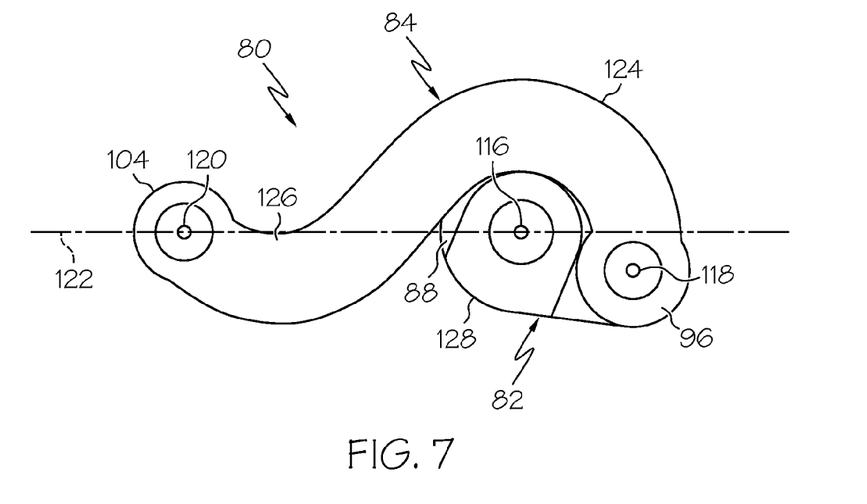
FIGS. 7 and 8 are side views of the bi-stable, over-center locking mechanism shown in FIGS. 3-6 in retracted and extended locked positions, respectively, as further illustrated in accordance with an exemplary embodiment.
Figure 8:
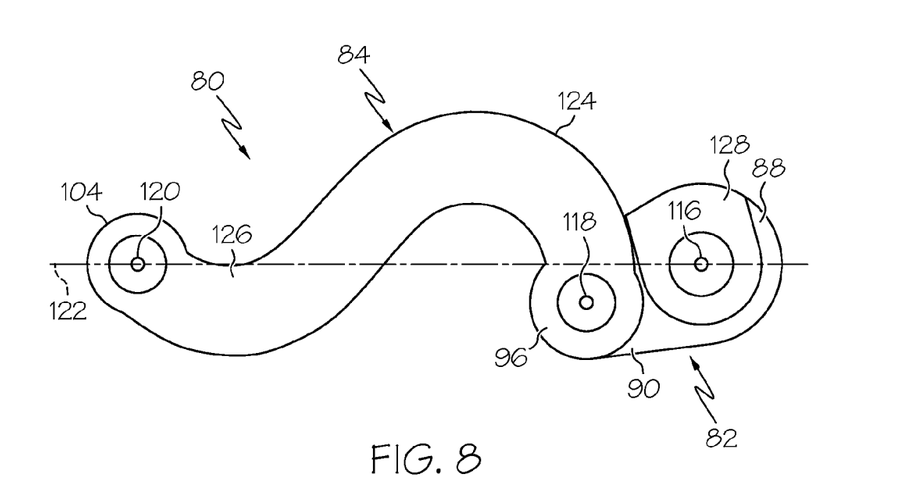

The mechanical, bi-stable locking action of locking mechanism 80 is provided, at least in substantial part, by the relative positioning and movement of motor arm 82 and over-center link 84. This may be more fully appreciated by referring to FIGS. 7 and 8, which illustrate motor arm 82 and over-center link 84 when over-center locking mechanism 80 (partially shown) resides in the retracted position (FIG. 7) and the extended position (FIG. 8). In FIGS. 7 and 8, the fixed rotational axis around which motor arm 82 rotates is represented by circle 116; the input pivot joint allowing relative rotation between output end 90 of motor arm 82 and input end 96 of over-center link 84 is represented by circle 118; and the output pivot joint allowing relative rotation between output end 104 of over-center link 84 and base member 50 of MMD receptacle 22 (shown in FIGS. 1-6) is represented by circle 120. As can be seen, input pivot point 118 resides on a first side of (e.g., below) a plane 122 transecting fixed rotational axis 116 and output pivot point 120 when over-center locking mechanism 80 resides in the retracted position shown in FIG. 7. As rotation of motor arm 82 in a clockwise direction is prevented in the retracted position (FIG. 7) for reasons that will be explained more fully below, so too is the forced extension of over-center link 84. Over-center locking mechanism 80 is thus generally prevented from being forcefully moved from the retracted position (FIG. 7) toward the extended position (FIG. 8) by application of force to MMD receptacle 22 thereby locking receptacle 22 in the retaining position. Similarly, when over-center locking mechanism 80 resides in the extended position shown in FIG. 8, input pivot point 118 again resides on the first side of plane 122; i.e., below plane 122 in the illustrated orientation. As motor arm 82 cannot be rotated in a counterclockwise direction when locking mechanism is in the extended position (FIG. 8), over-center locking mechanism 80 cannot be forcefully retracted and MMD receptacle 22 is locked in the loading position (FIGS. 1 and 3). To purposefully move over-center locking mechanism 80 into the retracted position (FIG. 7) from the extend position (FIG. 8), actuator 28 (FIGS. 1-6) need only rotate motor arm 82 in the appropriate direction (e.g., clockwise). It will be noted that input pivot point 116 traverses plane 122 as over-center locking mechanism 80 moves between the extended position (FIG. 8) and the retracted position (FIG. 7).

In the exemplary embodiment illustrated in FIGS. 1-8, over-center link 84 is fabricated to have a generally S-shaped geometry including first and second curved sections 124 and 126 (identified in FIGS. 7 and 8). As can be seen most clearly in FIG. 7, when over-center locking mechanism 80 resides in the retracted position, curved section 124 of over-center link 84 extends around a generally cylindrical protrusion or boss 128 extending from input end 88 of motor arm 82. Such a structural arrangement provides at least two advantages. First, the curved or undulating shaped of over-center link 84 imparts link 84 with a compliance or resiliency in a longitudinal direction, which allows over-center link 84 to firmly snap into place when moving from the extended position (FIG. 8) into the retracted position (FIG. 7). Second, the inner circumferential surface of curved section 124 contacts or pinches against boss 128 when over-center locking mechanism 80 is rotated fully into the retracted position (FIG. 7) to provide a first hardstop preventing over-rotation of motor arm 82 in a clockwise direction. The outer circumferential surface of curved section 124 likewise pinches against boss 128 when locking mechanism 80 is rotated fully into the extended position (FIG. 8) to provide a second hardstop preventing over-rotation of motor arm 82 in a counterclockwise direction. The above-noted advantages notwithstanding, over-center link 84 may assume other curved and non-curved shapes (e.g., C-shaped geometries) in further embodiments, in which case over-rotation of motor arm 82 in clockwise and counterclockwise directions may be prevented by separately provided or discrete hardstop features.

Figure 9:
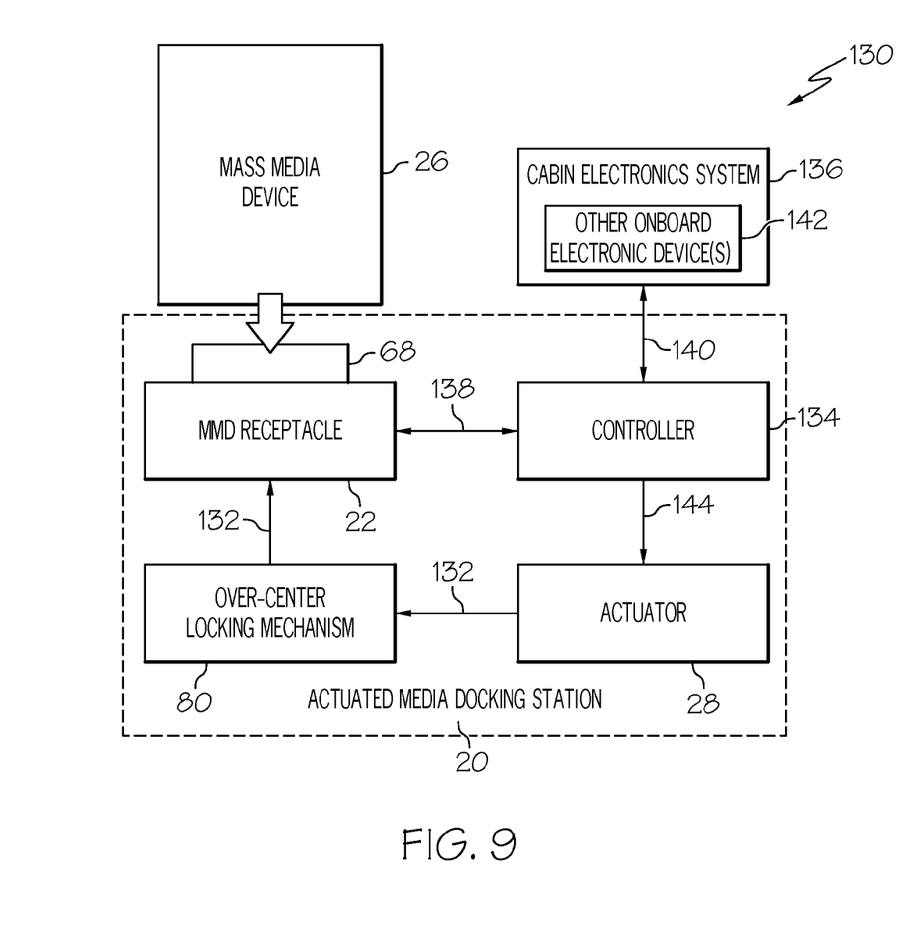
FIG. 9 is a schematic generically illustrating an exemplary avionic media system in which the actuated media docking station shown in FIGS. 1-6 may be included.

FIG. 9 is a schematic of an avionic media system 130 in which actuated media docking station 20 (FIGS. 1-6) may be included in accordance with an exemplary embodiment of the present invention. For clarity, actuated media docking station 20 is illustrated in FIG. 9 as including only MMD receptacle 22, multi-pin connector 68, actuator 28, and over-center locking mechanism 80 (the mechanical connection between these components generically represented in FIG. 9 by arrows 132). Avionic media system 130 further includes a controller 134, which may be integrated into actuated media docking station 20 as a controller board, and a cabin electronics systems 136. As indicated in FIG. 9 by double-headed arrow 138, connector 68 is electrically coupled to controller 134 through MMD receptacle 28 to permit bi-directional communication between connector 68 and controller 134. Controller 134 is, in turn, operably coupled to cabin electronics system 136 (indicated by double-headed arrow 140) to enable the transfer of electrical signals to and/or from one or more onboard electronic devices 142 included within avionic media system 130. Devices 142 may include, for example, one or more monitors on which video content from MMD 26 may be rendered, an audio system on which audio content from MMD 26 may be played, a computer system including a memory to which data files from MMD 26 can be uploaded or from which data files can be downloaded to MMD 26, and so on. In certain embodiments, controller 134 may be configured to decrypt the signals received from MMD 26 and supply corresponding decrypted signals to cabin electronics system 136. Docking station 20 may be electrically coupled cabin electronics system 136 utilizing one or more wire harnesses.

As further indicated in FIG. 9 by arrow 144, controller 134 includes an additional output coupled to an input of actuator 28. During operation of avionic media system 120, controller 134 selectively commands actuator 28 to rotate MMD receptacle 22 between the loading position (FIGS. 1 and 3) and retaining position (FIGS. 2 and 4). As previously stated, controller 134 may command actuator 28 to rotate MMD receptacle 22 between the loading and retaining positions in response to actuation of a user input, such as button 32 shown in FIGS. 1 and 2. Additionally or alternatively, controller 134 may command actuator 28 to rotate MMD receptacle 22 into the retaining position (providing that receptacle 22 is not already therein) when determining that significant disturbance forces are applied or are more likely to be applied to actuated media docking station 20. For example, controller 134 may command actuator 28 to rotate receptacle 22 into the retaining position (FIGS. 2 and 4) immediately prior to or during takeoff, abrupt maneuvering, or turbulence encounter, or landing of the host aircraft as may be determined by monitoring signals issued from the aircraft cockpit.

There has thus been provided embodiments of an actuated media docking station well-suited for usage onboard an aircraft or other vehicle. Advantageously, the above-described exemplary docking station is relatively lightweight, rugged, compact, and capable of operation in both horizontal and vertical orientations to permit integration of the docking station into various locations within the aircraft, such as mounting within a cabin wall. In addition, embodiments of the above-described media docking station allow retraction or withdraw of a docked mass media device into a ruggedized housing such that the mass media device cannot be thrown or dislodged from the docking station in the event of abrupt inertial loads. Furthermore, the media docking station securely locks the mass media device in such a retracted or retaining position and, in preferred embodiments, in an extend or loading position utilizing a bi-stable, over-center locking mechanism requiring little to no power consumption. Finally, the foregoing has also provided embodiments of an avionic media systems including such an actuated media docking station.

While described above in conjunction with an exemplary actuated media docking station, embodiments of the over-center locking mechanism can be utilized within any device including a pivoting member (e.g., in the case of docking station 20 shown in FIGS. 1-6, mass media device receptacle 22) and a rotary actuator (e.g., rotary actuator 28 shown in FIGS. 3-6) wherein it is desired to mechanically lock or latch the pivoting member in two positional extremes. In this regard, the foregoing has further provided embodiments of a bi-stable, over-centering locking mechanism including a motor arm configured to be fixedly coupled to the rotary actuator for rotation about a fixed rotational axis, and an over-center link rotatably coupled to the motor arm at an input pivot point and configured to be rotatably coupled to the pivoting member at an output pivot point. The over-center locking mechanism is movable between: (i) an extended position wherein the input pivot point resides on a first side of a plane transecting the fixed rotational axis and the output pivot point, and (ii) a refracted position wherein the input pivot point also resides on the first side of the plane transecting the fixed rotational axis and the output pivot point. The input pivot point traverses the plane when the over-center locking mechanism is moved between the extended position and the retracted position.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An actuated media docking station, comprising:
    a housing assembly;
    a mass media device ("MMD") receptacle hingedly mounted to the housing assembly;
    a rotary actuator coupled to the housing assembly and to the MMD receptacle and, when actuated, rotating the MMD receptacle between a loading position and a retaining position; and
    an over-center locking mechanism linking the actuator to the MMD receptacle, the over-center locking mechanism comprising:
        a motor arm fixedly coupled to the rotary actuator and, when driven thereby, rotating about a fixed rotational axis; and
        an over-center link rotatably coupled to the motor arm at an input pivot point
    and rotatably coupled to the MMD receptacle at an output pivot point;
    wherein the input pivot point resides on a first side of a plane transecting the fixed rotational axis and the output pivot point when the MMD receptacle is in both the loading and retaining positions, and wherein the input pivot point traverses the plane when the MMD receptacle is rotated between the loading and retaining positions.

2. An avionic media system according to claim 1 wherein the removal of the MMD from the MMD receptacle is physically obstructed by a wall of the housing assembly when the MMD receptacle is in the retaining position.

3. An avionic media system according to claim 2 wherein the MMD receptacle is hingedly mounted to the housing assembly and rotatable between the extended and retaining positions.

4. An avionic media system according to claim 3 wherein the MMD receptacle comprises a receiving end portion having an opening through which the MMD can be slidably inserted when the MMD receptacle is in the loading position.

5. An avionic media system according to claim 4 wherein the opening in the receiving end portion is at least partially covered by the wall of the housing assembly when the MMD receptacle is in the retaining position.

6. An avionic media system according to claim 5 wherein the MMD receptacle further comprises a base member substantially opposing the receiving end portion and hingedly mounted to the housing assembly.

7. An avionic media system according to claim 4 wherein the actuated media docking station further comprises an open device cavity provided in the housing assembly, the receiving end portion of the MMD receptacle located outside of the open device cavity when the MMD receptacle is in the loading position and swinging into the open device cavity when the MMD receptacle is rotated into the retaining position.

8. An avionic media system according to claim 5 wherein the MMD receptacle comprises:
- a backrest extending longitudinally from the base member;
- opposing sidewalls extending from the longitudinal edges of the backrest; and
- retention tabs extending laterally inwardly from the opposing sidewalls to prevent removal of the MMD from the MMD receptacle in an axial direction.

9. An avionic media system according to claim 3 further comprising an over-center locking mechanism linking the actuator to the MMD receptacle.

10. An avionic media system according to claim 9 wherein the over-center locking mechanism mechanically locks the MMD receptacle in the extended and retaining positions.

11. An avionic media system according to claim 10 wherein the actuator has a rotary output, and wherein the over-center locking mechanism comprises:
- a motor arm fixedly coupled to the rotary actuator and, when driven thereby, rotating about a fixed rotational axis; and
- an over-center link rotatably coupled to the motor arm at an input pivot point and rotatably coupled to the MMD receptacle at an output pivot point.

12. An avionic media system according to claim 11 wherein rotation of the rotary output of the actuator moves the over-center locking mechanism between: (i) an extended locked position wherein the input pivot point resides on a first side of a plane transecting the fixed rotational axis and the output pivot point, and (ii) a retracted locked position wherein the input pivot point also resides on the first side of the plane transecting the fixed rotational axis and the output pivot point; and
- wherein the input pivot point traverses the plane when the over-center locking mechanism is moved between the extended locked position and the retracted locked position.

13. An avionic media system according to claim 11 wherein the over-center link has a curved portion extending at least partially around the motor arm when the over-center locking mechanism is in the retracted locked position.

14. An avionic media system according to claim 13 wherein the motor arm comprises a boss contacting the curved portion of the over-center link in at least one of the extended and retracted locked positions to provide a hardstop.

15. An avionic media system according to claim 3 further comprising a controller operably coupled to the actuator and configured to command the actuator to move the MMD receptacle into the retaining position prior to at least one of aircraft takeoff and landing.

16. An actuated media docking station, comprising:
- a housing assembly;
- a mass media device ("MMD") receptacle hingedly mounted to the housing assembly and rotatable between: (i) a loading position in which an MMD can be inserted into the MMD receptacle, and (ii) a retaining position in which removal of an MMD from the MMD receptacle is physically obstructed;
- an actuator coupled to the housing assembly and to the MMD receptacle and, when actuated, rotating the MMD receptacle between the loading and retaining positions;
- an open device cavity in the housing assembly and exposed through an outer face of thereof such that the MMD is manually accessible when the MMD receptacle is in the retaining position, the MMD swinging into the open device cavity when rotating from the loading position into the retaining position; and
- an over-center locking mechanism having an S-shaped over-center link coupled between the actuator and the MMD receptacle, the over-center locking mechanism mechanically latching the MMD receptacle in the retaining position when the actuator rotates the MMD receptacle from the loading position into the retaining position.

17. An actuated media docking station according to claim 16 wherein the over-center locking mechanism further mechanically latches the MMD receptacle in the loading position when the actuator rotates the MMD receptacle from the retaining position into the loading position.

* * * * *